United States Patent [19]

Brown

[11] 3,743,428
[45] July 3, 1973

[54] DEVICE FOR OPTICALLY MEASURING A DIMENSION OF AN OBJECT
[75] Inventor: John B. Brown, Wilmington, Del.
[73] Assignee: E. I. du Pont de Nemours and Company, Wilmington, Del.
[22] Filed: Aug. 4, 1971
[21] Appl. No.: 168,952

[52] U.S. Cl.... 356/160, 250/219 WD, 250/219 TH, 356/267
[51] Int. Cl. .......................................... G01b 11/02
[58] Field of Search.................... 356/156, 159, 160, 356/167; 250/219 TH, 219 LG, 219 WD

[56] References Cited
UNITED STATES PATENTS
3,566,135  2/1971  Mouchart ....................... 356/167 X
3,655,989  4/1972  Robinson ........................ 356/159 X FOREIGN PATENTS OR APPLICATIONS
6,509,665  2/1966  Netherlands ....................... 356/159

Primary Examiner—Ronald L. Wibert
Assistant Examiner—F. L. Evans
Attorney—Raymond E. Blomstedt

[57] ABSTRACT

An apparatus for measuring a dimension of a physical object and comprising means for producing a collimated beam of light having a dimension at least as large as acceptable variations in the dimension of the object being measured, means for dividing the collimated beam of light into spatial digits, and means for counting the digits of light, the latter means spaced from the light beam source sufficiently to accommodate therein between the portion of the object to be measured.

5 Claims, 3 Drawing Figures

PATENTED JUL 3 1973 3,743,428

INVENTOR
JOHN B. BROWN

BY Raymond E. Blomfield
ATTORNEY

DEVICE FOR OPTICALLY MEASURING A DIMENSION OF AN OBJECT

BACKGROUND OF THE INVENTION

This invention relates to an apparatus and method for optically measuring a dimension of a physical object. More particularly it relates to use of a spatially digitized beam of light to make the measurement.

It is sometimes desirable to measure some dimension of a stationary or moving object, for example, a continuous length of pipe, foam or other extrudate that should not be touched by a mechanical measuring device. Optical means have been employed to make a determination of the desired dimension by photoelectrically measuring the obscuration by the object of a light beam directed across a measuring space. Such systems require the light beam to be very uniform in its intensity distribution if the object moves at all laterally through the measuring space. Otherwise a given object will obscure more light in one position than another, and the detector will give two different indications for the same size object. Furthermore, the simplest of these systems requires frequent calibration to account for the gradual decrease in the light source intensity as it ages, or requires a second photodetector to sense this light decrease in combination with means for compensating for the decrease. But even such a two photodetector system is of very limited use if there is present in the object space a varying and significant amount of dust, smoke or mist. The measuring photodetector in any of the above methods cannot distinguish the change in obscuration due to a change in the amount of dust, smoke or mist, and the change in obscuration due to the object being measured.

Thus there has been a need for a means to determine a dimension of an object such as the diameter of a pipe moving through a space in a non-restricted pass line, where the movement of the object is not constrained or restricted, such as by rigid guides. Furthermore, the means employed should be independent of the intensity of the light traversing the measuring space.

SUMMARY OF THE INVENTION

According to this invention there is provided an apparatus for measuring a dimension of a physical object and comprising means for producing a collimated beam of light having at least one transverse dimension at least as great as the acceptable variations in the dimension of the object being measured, means for spatially dividing the collimated beam of light into digits, and means for counting the digits of light, the latter means separated from the light source sufficiently to accommodate therein between the portion of the object to be measured.

There is also provided a precess for measuring a linear dimension of a physical object consisting essentially of projecting a collimated beam of light toward the object and generally perpendicular to the dimension to be measured dividing the beam of light into digits, counting those digits of light which do not strike the object (i.e., are not blocked thereby) and indicating the count. The term "digit(s)" refers to closely spaced (preferably uniformly) light zones.

Since the device of this invention senses only the number of digits passing out of the measuring area (that is, digits not blocked by the object) the method is independent of the light source intensity fluctuations so long as the counting mechanism is sufficiently sensitive to be activated by the weakest light passing through the measuring space and striking the counter. Subject to this qualification the device of this invention is free from the interference of smoke, dust, mist or other light scattering material and is useful so long as such interference does not reduce the intensity of any digit of the collimated light beam to a value below the threshold sensitivity of the counting mechanism.

DESCRIPTION OF THE INVENTION

Figure 1:
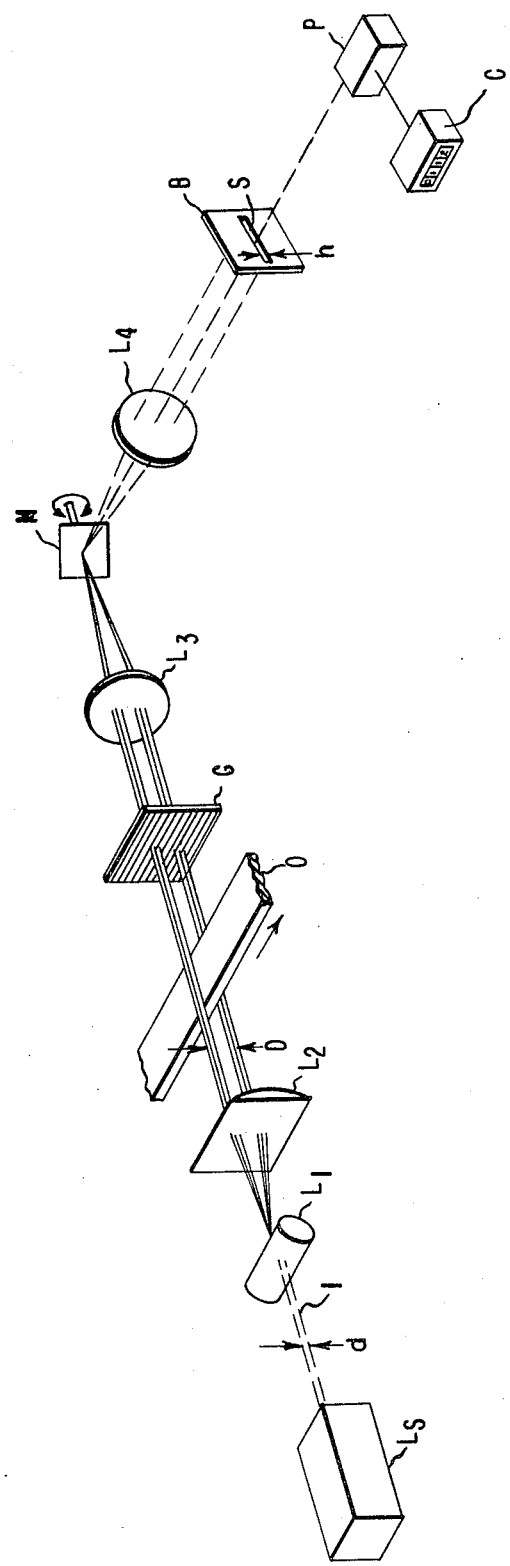
FIG. 1 is a schematic view of a preferred device of this invention

The apparatus of this invention includes a means for producing a collimated beam of light having at least one transverse dimension at least as great as the acceptable variations in the dimension of the object being measured and preferably significantly greater than the dimension of the object being measured in order to accommodate lateral motion of the object. The means can consist of any light source capable of producing such a beam of light, and preferably the light source produces a beam with highly parallel rays. By "highly parallel rays" is meant that the divergence of the beam is typically on the order of about 1–2 milliradians. A laser light source readily meets the requirement, but an arc lamp or other gaseous discharge lamp in combination with suitable optical elements to produce a collimated beam can be used. The art skilled are well aware of means for producing collimated light beams.

The collimated light beam utilized in this invention is at least as great in one cross-sectional direction as the maximum acceptable variation in the dimension of the object measured. Thus when the dimension measured is the vertical thickness of a sheet material or pipe passing lengthwise through the measuring space of the apparatus of this invention while lying flat on a smooth straight bed, the collimated light beam is conveniently directed horizontally (and transversely to the moving object) at the object. If the lower surface of the object is firmly on the bed the vertical height uniformity of the object can be monitored by this invention by simply scanning the upper surface of the object. This will require a collimated light beam with a vertical dimension at least as large as the acceptable variations of the thickness of the object above the bed. The apparatus is much more versatile, however, and can readily detect dimensional variations of an object passing through the measuring space in free unsupported condition (e.g., with no conveyor bed). Under these conditions it is convenient to use a collimated light beam with a vertical dimension at least as large as the vertical dimension to be measured at its largest acceptable size. Also, it is desirable for greatest accuracy that the object measured be positioned to allow some of the collimated light beam to pass under the object for sensing and counting and some over it to accommodate lateral motion of the object.

A preferred embodiment of this invention employs a low-powered laser light source and an expanding telescopic lens system for enlarging the cross-sectional area of the beam and increasing the parallelism of the light rays. The laser light source useful in this invention is of a type well known in the art. Typically a one milliwatt helium-neon continuous wave laser is used. Such a laser usually produces a light beam of circular cross-section having a diameter of about 1-2 millimeters. However, the diameter of the beam is not critical to the successful operation of this invention as long as there can be produced a collimated beam of light having at least one transverse dimension at least as great as the maximum variations of the dimension of the object being measured. When a light source having a narrower beam is employed, an expanding telescopic lens system can be used to expand the beam as needed. A preferred lens system consists essentially of two cylindrical lenses in a telescopic configuration to expand the beam in one dimension to an extent greater than the dimension of the object being measured.

The use in this invention of a low-powered laser light source and a collimating lens system can be more clearly understood by reference to FIG. 1 which is a schematic view of a preferred device of this invention. Referring to FIG. 1, the light beam 1 from a small low-powered continuous wave laser LS is expanded in one dimension by means of cylindrical lenses $L_1$ and $L_2$.

The dimensions and properties of the cylindrical lens system can be readily determined by one skilled in the art. Typically, the ratio of the focal length of lens $L_2$ and $L_1$ is equal to the ratio of dimension D to dimension $d$ in FIG. 1. For example, if $d$ equals 1 millimeter, and the ratio of the focal lengths of $L_1$ to $L_2$ is 1:50, then object O in the measuring space between $L_2$ and $L_3$ is illuminated by a rectangular beam of light 50 millimeters high by 1 millimeter wide. The beam of light traversing the measuring space consists of highly parallel rays. Hence, the object O will cast a very sharp shadow on grid G positioned after the object and before lens $L_3$. Alternatively, grid G can be placed after lens $L_2$ and before object O.

Grid G is typical of the means for spatially digitizing the collimated beam of light. The grid typically consists of a transparent material, such as glass or plastic containing parallel alternate transparent and opaque bars or lines. If, as preferred, the transparent and opaque bars or lines are equal in width, this would correspond to the familiar Ronchi ruling or grating. The spacing between lines called the grid spacing or spatial frequency determines the precision of the measurement since the determination of a dimension by this method pivots about the counting of a discrete number of the transparent bars obscured (or not obscured) by the object. The maximum error in the determination of the dimension will be equal to the grid spacing. If it is desired to determine the dimension of the object with a precision of 0.02 inch then the grid spacing should be 0.02 inch or have a spatial frequency of 50 line pairs per inch.

Grid G should be of a size and in a position to intercept the cross-sectional area of the collimated light beam corresponding to maximum variations in the dimension measured. Preferably grid G will intercept a substantially larger area than this so as to extend beyond the maximum and minimum dimensions which are acceptable, to provide continuous monitoring of products exceeding specification limits.

Figure 3:
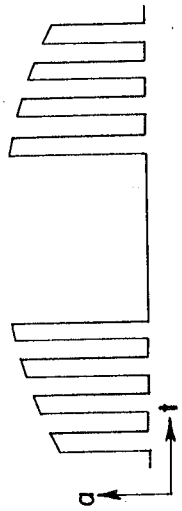
FIGS. 2 and 3 are diagrams of representative electrical signals produced by photodetector P in FIG. 1.
Figure 2:
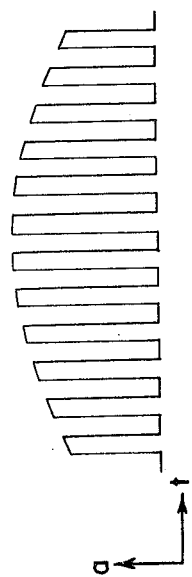

In overall effect, grid G serves to divide the coherent light coming from source LS into a number of uniformly spaced zones. The light beam is thus spatially digitized. If a photodetector is placed behind grid G, it will sense both a number of discrete light zones separated by dark and variations in light intensity from one zone to the next as shown in FIGS. 2 and 3. In this invention, use is made only of the number of light zones (or dark zones) in the beam emerging from the object space.

After the beam of light traversing the measuring space has been divided into spatial digits, means are provided for counting the digits of light. Instead of using the intensity of the light beam as the measuring variable, this invention measures the number of digits of light not obscured by object O. So long as the intensity of each light digit passing through the measuring space (where the object is located) is above the threshold limit of the photodetector, each digit will be counted independently of intensity variations. Counting the light digits is accomplished by a lens and mirror combination shown in FIG. 1. Light that is not obscured by the object O is spatially digitized by grid G, and is caused to converge by lens $L_3$. This convergent light is reflected off mirror M, which is oscillating about a horizontal axis coincident with the optical axis of the system. The oscillating mirror converts the spatially digitized signal which is counted. Since the mirror scans the cone of light coming from spherical lens $L_3$, the lens should be large enough to intercept that area of the cone used in the particular measurement under consideration. The frequency of oscillation is not critical, but is limited by the speed of response of the detector described hereinafter. The frequency of oscillation can vary widely, and for convenience can be about 1 KHz. The arc covered by the oscillating mirror should be such that it scans the entire cone of light coming from lens $L_3$. This arc is typically less than about 10°. Oscillating mirrors of the type useful in this invention are commercially available and are well known to those skilled in the art.

Light from mirror M is reflected to photodetector P and counter C which detects and counts the digits of light respectively. Spherical lens $L_4$ recollimates the light reflected from the mirror since its primary focus coincides with the secondary focus of $L_3$. The height $h$ of slit S is equal to the height of one of the grid bars if lens $L_4$ has the same focal length as $L_3$. If lens $L_4$ has a focal length twice that of $L_3$, then slit S has a height $h$ equal to twice the height of the grid bars. It is apparent that the proper height of slit S can be readily calculated from the ratio of the focal lengths of lenses $L_3$ and $L_4$ and the height of the bars on grid G.

A photosensitive device, such as photodector P and counter C, is mounted behind slit S to detect and count the pulses of light. The light sensitive device is one of the type well known in the art. For example, a photoelectric cell or a solid state device, such as a silicon photovoltaic diode, can be used. Knowing the height of slit S, and the minimum intensity of light at S, a light sensitive device can easily be selected by one skilled in the art. Representative electrical signals produced by the photodetector P as a function of time $t$ and amplitude $a$ are shown schematically in FIGS. 2 and 3. FIG. 2 represents the signal with no object O in the object space and FIG. 3 the signal with an object O present in the object space.

The required divergence of the light beam for a given application is determined by the distance between the object and the grid and the grid spacing which, in turn, is determined by the required precision. Any blur of the shadow of the edge of the object on the grid should be less than the grid spacing.

The number of pulses counted and indicated by the counter is determined by the frequency of the oscillating mirror, grid spacing, width of the grid, the dimension of the object being measured, and the counting period. If the grid is 2 inches high with 100 transparent bars of equal height separated by a distance equal to that height and if the oscillating mirror frequency is 1,000 cycles per second, and further if the counting or sampling period is 0.1 second, with no object in the measuring space, the counter will indicate 20,000.

If, with such a grid, an object O 0.750 inch thick is placed in the object space, and if all the other parameters are as given above, then the object O will cast a shadow on the grid G and thus obscure the light that would otherwise pass through 37 of the transparent bars. The remaining unobscured 63 bars will cause the counter to indicate 12,600. If this is subtracted from 20,000 and a scaling factor of 0.0001 inch/count is applied to the difference, the indicated thickness is 0.740 inch. The difference of 0.010 inch is the error introduced by the grid spacing.

If, however, there is some vertical motion of the object being measured as it passed through the object space, the accuracy of the measurement is increased significantly if the vertical motion is greater than the grid spacing and occurs in a time significantly less than the counting period because an averaging effect results. For example, in the above case the indicated count will be the average of 200 determinations some of which will be high by a few counts and some of which will be low by a few counts. The extent to which this averaging improves the precision depends on the nature of the object motion.

It will be apparent that in the device described above, one count is sensed by the photodetector P and counter C in FIG. 1 for each unobscured transparent bar in grid G each time the oscillating mirror scans the dimension D. Since the number of obscured transparent bars is proportional to the dimension of the object O being measured, there exists an inverse relationship between the dimension of the object being measured and the count indicated by the usual type of electronic counter which "counts up" from zero. The count, $K$, indicated by the counter with no object in the measuring span is fixed as follows:

$$K = 2(f_s)(D)(f_m)(t) \quad (1)$$

where:
$f_s$ = spatial frequency of grid G in bars/inch or the effective spatial frequency in the case of modulating the laser beam and not using a grid,
$D$ = width of total light beam as shown in FIG. 1, in.,
$f_m$ = frequency of oscillating mirror M, cycles/sec., and
$t$ = sampling period, sec.

The factor 2 is required to account for the fact that the mirror scans the measuring space in FIG. 1 twice for each cycle of the mirror oscillation.

When there is an object in the measuring space, the count $K'$, as indicated by the typical "count up" counter, is derived from the following equation:

$$K' = [1 - (W/D)]K \quad (2)$$

where: $W$ = dimension of the object being measured, inch. The dimension of the object is equal to the product of $(K-K')$ multiplied by a scaling factor F, which in the above example is 0.0001 in./count. Scaling factor F is given by the following equation:

$$F = 1/[2(f_s)(f_m)(t)] \quad (3)$$

and $F$ has the dimensions of inches per count.

If it is desired to have a direct reading device, obviating the subtraction, then a second type of counter, a "count down" type can be used. In the present instance such a counter would start counting from $K$ and its indication would decrease until at the end of the sampling period it would display $K-K'$, the width of the object (after scaling).

It will be apparent that this invention can be implemented in a number of ways, and that the device shown in FIG. 1 is only one of many equivalent devices. For example, since the grid, G, serves only to digitize the optical signal spatially, a modification of the above method is obvious. The spatial digitization of the beam shown in FIG. 1 results in a temporally digitized signal at the photodetector as a result of the scanning produced by the oscillating mirror M. The temporal digitization can be produced also by modulating the laser intensity directly and eliminating the grid altogether. This can be effected by a variety of electical, electro-optical or mechanical means, e.g., direct electrical modulation of the laser discharge, electro-optical modulation of the laser beam, as with a Kerr cell, or with a rapidly rotating polarizing filter, or a segmented chopper wheel (e.g., rotating segmented disc). The applicability of any of these will be determined by the various parameters of the system discussed above.

It will be obvious that the frequency at which the laser beam is modulated or interrupted determines the precision of the measurement now instead of the grid spacing. To achieve the same precision, 0.01 inch, of the above example wherein the grid had a spatial frequency of 50 line pairs per inch or 100 bars for a 2 inch wide object space, the laser beam must be modulated at a frequency of 100 × 2,000 = KHz. That is, the laser beam must be turned "off" and "on" 100 times for each half cycle of a mirror oscillation. Further, it will be obvious that the ratio of the laser beam modulation frequency to the mirror frequency should be constant. The fixing of this ratio is readily accomplished and the means for doing so is well known to those skilled in the art.

Similarly, one skilled in the art will recognize alternatives to the previously described means for optically scanning the digits of light. For example, a light-sensitive device can be used to scan directly the beam of light passing through grid G. Lens $L_3$, the oscillating mirror M, and lens $L_4$ are not required in this case. The device would produce a signal similar to that shown diagrammatically in FIG. 3 when object O is present and similar to that in FIG. 2 where no object is present.

Another means for counting optical digits, which is somewhat more complex electronically, involves the use of a linear array of small discrete photodetectors in place of grid G. The grid G and all the optical elements to the right of it in FIG. 1 are not required in this embodiment. Such an array of detectors is similar to the monolithic semiconductor devices presently available for use in photoelectric card readers. To have the same precision as in the embodiment described above, such an array consists of 100 photodetectors spaced on 0.02 inch centers. Each of the photodetectors has associated with it an electronic signal level discriminator such that the output of each photodetector is one of two binary states, 1 or 0, depending on whether the particular photodetector is or is not shadowed (obscured) by the object in the object space. A count and display of the number of shadowed photodetectors which indicates the desired dimension can be achieved in one of two ways: (1) by sequentially interrogating each of the 100 channels and displaying the number of channels in the 1 state on an electronic counter or (2) by simultaneously decoding the 100 channel binary matrix and displaying the result on an electronic digital voltmeter.

The counter can indicate the count in any convenient manner, as by sound, light recording or the like. By continuously recording against a norm a complete history of variations in size of the dimension measured will be available and this would be advantageous in commercial operations.

The advantages of this invention are that it provides a noncontacting method of measuring a dimension of an object and is suitable for use even in smoky or otherwise dirty atmospheres. It provides a very rapid response, and permits the object being measured to move unrestrictedly in the object space. The method is particularly useful for measuring the width of a continuously extruded elastomeric gasket material. This material is cured in a long oven which is smoke filled and through which the material moves along an ill-defined snake-like path. During some time in the oven the material is tacky and cannot be touched.

I claim:
1. An apparatus for measuring a linear dimension of a physical object comprising:
   a. a light source which produces a beam with highly parallel rays;
   b. an expanding collimating telescopic lens system which increases parallelism of the light rays and expands at least one transverse dimension of the light beam to a dimension at least as large as maximum variations in the linear dimension of the object being measured;
   c. means for dividing the expanded light beam into digits; and
   d. means for counting the digits of light, said means being separated from the telescopic lens system sufficiently to accomodate positioning of the object to be measured.

2. The apparatus of claim 1 wherein the means for dividing the expanded light is a grid of transparent and opaque lines equal in width, the width being no larger than the maximum error tolerable in measuring.

3. The apparatus of claim 2 wherein the light source is a low-powered continuous wave laser.

4. The apparatus of claim 3 wherein the means for counting the digits of light consist essentially of an oscillating mirror, an opaque barrier having a slit short dimension about equal to that of a grid line, a photocell positioned to detect light digits reflected from said oscillating mirror and passing through the slot of said opaque barrier, and an electric counter.

5. The apparatus of claim 4 wherein said telescopic lens system expands said light beam to a dimension greater than the dimension of the object being measured.

* * * * *

UNITED STATES PATENT AND TRADEMARK OFFICE
CERTIFICATE OF CORRECTION

PATENT NO.   : 3,743,428
DATED        : July 3, 1973
INVENTOR(S)  : John B. Brown It is certified that error appears in the above-identified patent and that said Letters Patent is hereby corrected as shown below:

Claim 4 should read as follows:

-- The apparatus of claim 3 wherein the means for counting the digits of light consist essentially of a first spherical lens, an oscillating mirror, a second spherical lens, an opaque barrier with a slit having a short dimension about equal to the size of the image of a grid line, a photocell, and a counter, said components positioned such that the digitized light, after passing the object to be measured, is, in sequence, converged by said first spherical lens, reflected by said oscillating mirror, recollimated by said second spherical lens, passed through said opaque barrier slit, detected and converted to electrical signals by said photocell, and the signals counted by said counter--.

This certificate supersedes the Certificate of Correction issued September 24, 1974.

Signed and Sealed this

First Day of January 1985

[SEAL]

Attest:

GERALD J. MOSSINGHOFF

Attesting Officer   Commissioner of Patents and Trademarks